Feb. 2, 1932.                J. KAPPELLY                1,843,325
                              BOTTLE COVER
                           Filed March 3, 1931
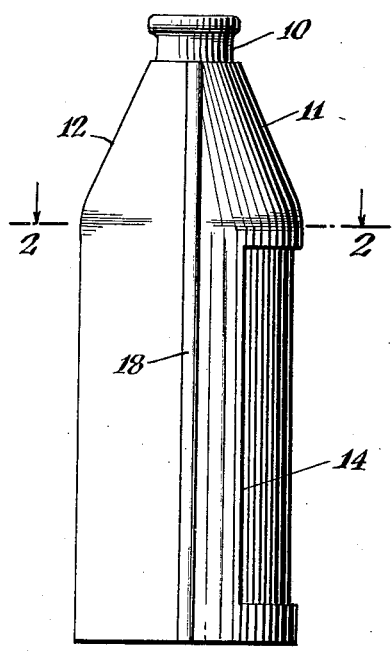
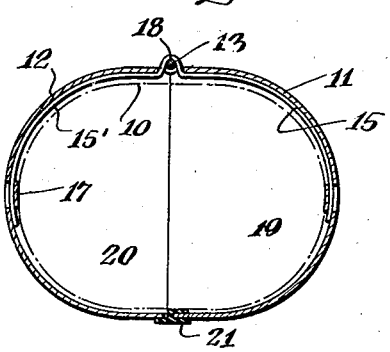
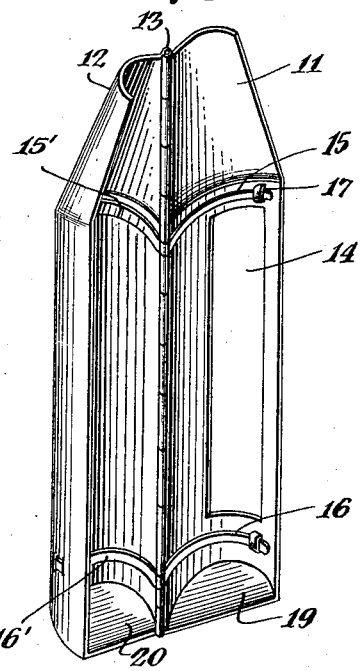
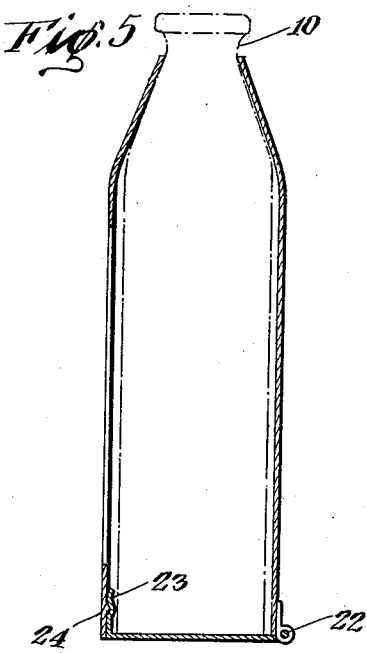
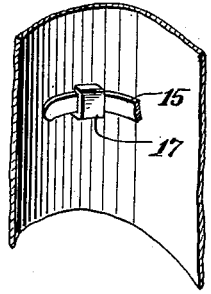
Inventor
Joseph Kappelly
By his Attorney Patented Feb. 2, 1932

1,843,325

UNITED STATES PATENT OFFICE

JOSEPH KAPPELLY, OF NEW YORK, N. Y.

BOTTLE COVER

Application filed March 3, 1931. Serial No. 519,762.

This invention relates to improvements in covers for bottles, and it is the principal object of my invention to provide a cover made in two hingedly connected parts allowing a convenient snapping of said cover over a bottle.

Another object of my invention is the provision of a bottle cover allowing a ready inspection of the bottle contents, particularly useful with graduated nursery bottles, which are protected by the cover against breaking.

A further object of my invention is the provison of a bottle cover allowing a convenient handling of hot bottles and of comparatively simple and therefore inexpensive construction, yet durable and highly efficient in operation.

A still further object of my invention is the provision of a bottle cover having a bottom part hinged to the cover and adapted to be engaged over the bottom and held to said cover in its engaged position.

These and other objects and advantages of my invention will become more fully apparent as the description thereof proceeds and will then be specifically defined in the appended claim.

In the accompanying drawings forming a material part of this disclosure:—

Fig. 1 is a side elevation of a bottle equipped with a cover constructed according to my invention.

Fig. 2 is a section on line 2—2 of Figure 1.

Fig. 3 shows the cover open with the bottle removed.

Fig. 4 is a fragmentary detail view of the cover closing means.

Fig. 5 is a longitudinal section through the cover and a movable bottom therefor.

As illustrated, a bottle 10 of any well known form and material is adapted to be enclosed in a cover surrounding its body part and consits of two parts 11 and 12 hingedly connected, as at 13, at their inner meeting edges.

Part 11 has a window 14 formed through which the contents of the bottle can be inspected and this is particularly important with graduated nursery bottles.

In order to make the closing action of the parts 11 and 12, about bottle 10, more positive, and exact, I provide near the upper and lower ends of these parts curved leaf springs 15, 16, and 15′, 16′ the ends of which are guided and held at their outer ends in eyes or loops 17, while intermediate their ends they are guided about the hinge pintle, as shown at 18.

The bottom parts of the parts 10 and 11 are designated 19, 20, respectively, and are held closed about the bottle, as are the parts 10 and 11 by suitable locking means generally designated 21.

As shown in Figure 5 the bottom may be hinged to the cover parts, as at 22 and closed by means of a spring lip 23 engaging a projection 24 of parts 10 and 11.

The operation of my device will be entirely clear from the above description and by having references to the drawings and it will be clear that the bottle can be readily encased in the cover by snapping both parts over the same, and if the movable bottom is provided by clamping the same to the cover parts as shown in Figure 5.

It will be apparent that the contents of the bottle may be conveniently inspected through the show opening 14 which is very essential for instance with graduated nursery bottles.

It will be understood that I have described and shown the preferred form of my invention only and that I may make such changes therein as come within the scope of the appended claim without departure from my invention.

Having thus described my invention, what I claim as new and desire to secure by Letters Patent is:

A bottle cover having straight walls provided with an inspection opening and a restricted neck part and a bottom hinged to the lower end of the cover at one end, a projection on said cover, and an elastic lip on said bottom having a depression at a point oppositely disposed to its hinge adapted to be engaged by said projection.

In witness whereof I have signed my name to this specification.

JOSEPH KAPPELLY.